(12) United States Patent
Namboodiri et al.

(10) Patent No.: US 11,770,145 B2
(45) Date of Patent: Sep. 26, 2023

(54) SYSTEM AND METHOD FOR EFFICIENT INITIALIZATION OF MEMORY DIGITAL PRE-DISTORTER COEFFICIENTS TO REDUCE CALIBRATION TIME

(71) Applicant: Samsung Electronics Co., Ltd., Gyeonggi-do (KR)

(72) Inventors: Vamadevan Namboodiri, Cupertino, CA (US); Wook Bong Lee, San Jose, CA (US); Donghan Kim, Gyeonggi-do (KR); Ruchen Duan, Santa Clara, CA (US); Mostafa Sayed Roshdy Ibrahim, San Jose, CA (US)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/885,187

(22) Filed: Aug. 10, 2022

(65) Prior Publication Data

US 2023/0062458 A1 Mar. 2, 2023

Related U.S. Application Data

(60) Provisional application No. 63/237,735, filed on Aug. 27, 2021.

(51) Int. Cl.
H04B 1/04 (2006.01)
(52) U.S. Cl.
CPC ... H04B 1/0475 (2013.01); *H04B 2001/0425* (2013.01)
(58) Field of Classification Search
CPC .......... H04B 1/0475; H04B 2001/0425; H04B 7/0673

(Continued)

(56) References Cited

U.S. PATENT DOCUMENTS 6,836,517 B2 12/2004 Nagatani et al.
6,907,085 B2 6/2005 Kubo et al.
(Continued)

FOREIGN PATENT DOCUMENTS

CN 102487367 9/2014
CN 113037226 6/2021
(Continued)

OTHER PUBLICATIONS

Guan, Lei et al., "Green Communications: Digital Predistortion for Wideband RF Power Amplifiers", IEEE Microwave Magazine 15.7, 84-99, Nov. 12, 2014.

(Continued)

*Primary Examiner* — Emmanuel Bayard
(74) *Attorney, Agent, or Firm* — The Farrell Law Firm, P.C.

(57) ABSTRACT

An electronic device configured to apply, to a first power amplifier (PA) input, one or more updated memory digital pre-distorter (mDPD) coefficient values is provided. The electronic device includes a processor; and a memory including a non-transitory computer readable storage medium storing instructions that, when executed, cause the processor to preload, from values stored in the memory of the electronic device, one or more mDPD coefficient values; transmit a training signal sequence while using the preloaded one or more mDPD coefficient values; receive the training signal sequence; update the one or more mDPD coefficient values based on the transmitted training signal sequence, the received training signal sequence, and the preloaded one or more mDPD coefficient values; and apply the updated one or more mDPD coefficient values to distort the first PA input.

20 Claims, 7 Drawing Sheets

(58) Field of Classification Search
USPC .................................................. 375/296–298
See application file for complete search history.

(56) References Cited

U.S. PATENT DOCUMENTS

| | | | |
|---|---|---|---|
| 7,149,257 | B2 | 12/2006 | Braithwaite |
| 7,333,559 | B2 | 2/2008 | Song et al. |
| 7,430,248 | B2 | 9/2008 | McCallister |
| 7,496,152 | B2 | 2/2009 | Nagatani et al. |
| 7,577,211 | B2 | 8/2009 | Braithwaite |
| 8,982,991 | B2 | 3/2015 | Woo |
| 8,989,307 | B2 | 3/2015 | Zhou et al. |
| 9,106,188 | B2 | 8/2015 | Tanio |
| 10,873,301 | B2 | 12/2020 | Chiron |
| 2005/0253745 | A1 | 11/2005 | Song et al. |
| 2009/0237158 | A1* | 9/2009 | Hehn ............... H03F 1/3247 330/149 |
| 2014/0254716 | A1* | 9/2014 | Zhou ............... H04B 1/0475 375/296 |
| 2019/0181803 | A1* | 6/2019 | Chiron ............... H03F 1/3247 |
| 2019/0229975 | A1* | 7/2019 | Khlat ............... H03G 3/3042 |
| 2021/0391832 | A1* | 12/2021 | Barbu ............... H03F 1/3247 |

FOREIGN PATENT DOCUMENTS

| | | |
|---|---|---|
| EP | 3635886 | 4/2020 |
| KR | 10-0625445 | 9/2006 |

OTHER PUBLICATIONS

Rodrigues, Henry Douglas et al., "Orthogonal Scalar Feedback Digital Pre-Distortion Linearization", IEEE Transactions on Broadcasting 64.2, 319-330, Oct. 9, 2017.

Ramsey, Aaron Franklin, "An Implementation of the Redirected Learning Architecture for Digital Pre-Distortion", Diss. Iowa State University 2020, pp. 69.

* cited by examiner

FIG. 1

Prior Art

FIG. 2

Prior Art

SYSTEM AND METHOD FOR EFFICIENT INITIALIZATION OF MEMORY DIGITAL PRE-DISTORTER COEFFICIENTS TO REDUCE CALIBRATION TIME

PRIORITY

This application is based on and claims priority under 35 U.S.C. § 119(e) to U.S. Provisional Patent Application No. 63/237,735, filed on Aug. 27, 2021 in the United Stated Patent and Trademark Office, the entire contents of which are incorporated herein by reference.

FIELD

The present disclosure relates generally to improving calibration of power amplifiers (PAs).

BACKGROUND

In wireless communication systems, radio frequency (RF) PAs typically operate to increase efficiency of a transmitter. In doing so, PAs output a gain voltage that may experience spectral inefficiencies across various amplitude levels. Ideally, however, the gain should be constant across all input amplitude levels to preserve the fidelity of the input signal (e.g., keep the waveform of the input signal intact). For example, the input signal may have a varying amplitude, which therefore has a varying power, however, ideally the PA output gain should remain constant across all input amplitude levels.

Figure 1:
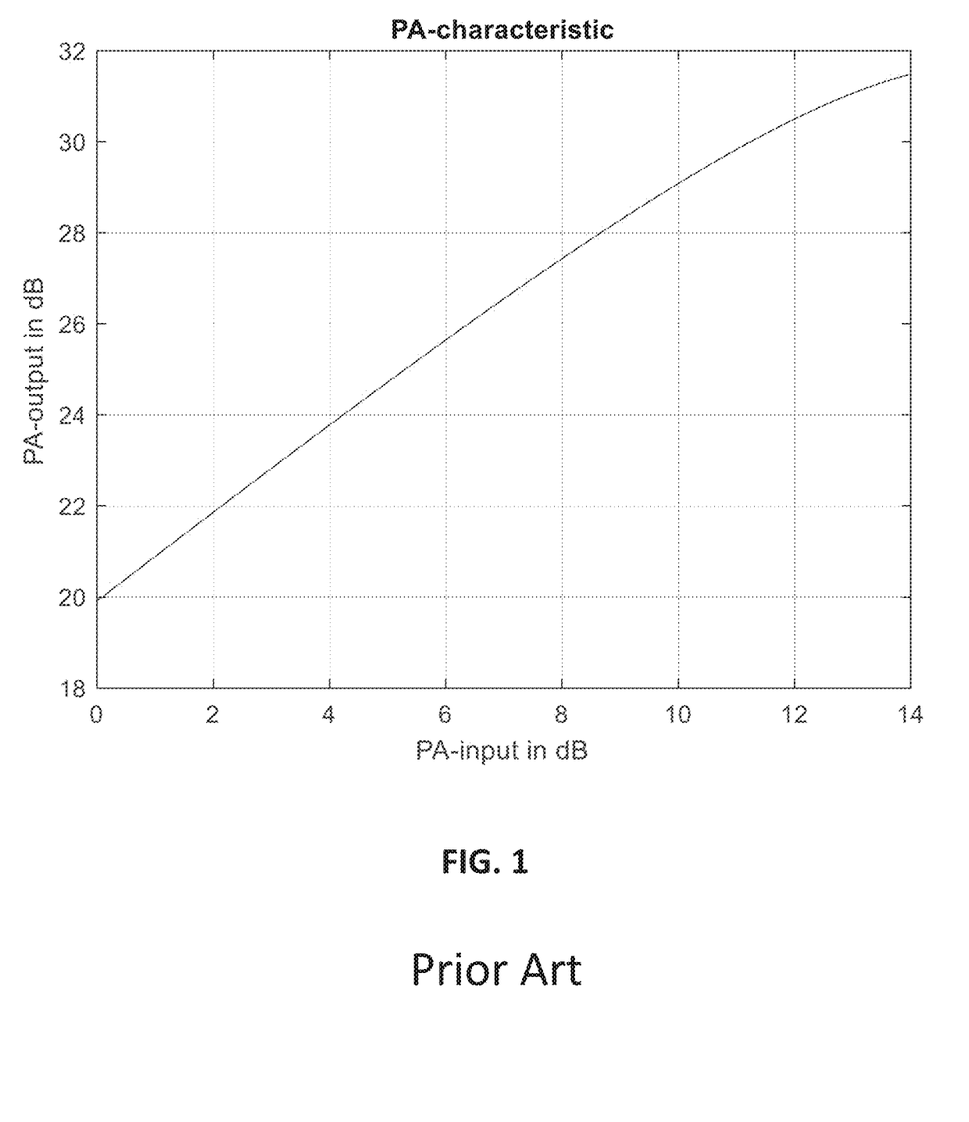
FIG. 1 is a graph illustrating an input/output characteristic of a PA, according to an embodiment.

Gallium Arsenide PAs may be a type of PA to more consistently provide a PA output gain voltage relative to a PA input gain voltage, however Gallium Arsenide PA's are expensive and therefore not feasible for many consumer electronics applications. Complementary metal-oxide-semiconductor (CMOS) PAs and Bipolar CMOS (BiCMOS) are more frequently used in for consumer electronics because they are cheap and more easily manufactured on a system on a chip (SoC) than gallium arsenide PAs For PAs that are not Gallium Arsenide PAs (e.g., CMOS and BiCMOS PAs), PA gain is constant when the input amplitude level is low. However, PA gain may tend to decrease as input amplitude increases, as shown in FIG. 1. FIG. 1 is a graph illustrating an input/output characteristic of a PA, according to an embodiment. As shown in FIG. 1, the PA-output dB has a 20 (decibel) dB increase relative to the PA-input dB at PA-input dB=0 (e.g., with respect to power, a 20 dB gain represents a ratio of 100 to 1 for power, so a 20 dB gain would be 100×). However, as the PA-input amplitude level increases, the PA-output amplitude level becomes more and more uncorrelated with the ideal PA-output amplitude level. This non-linearity affects transmit error vector magnitude (TX-EVM) and spectral mask requirements, as shown in FIG. 2

Figure 2:
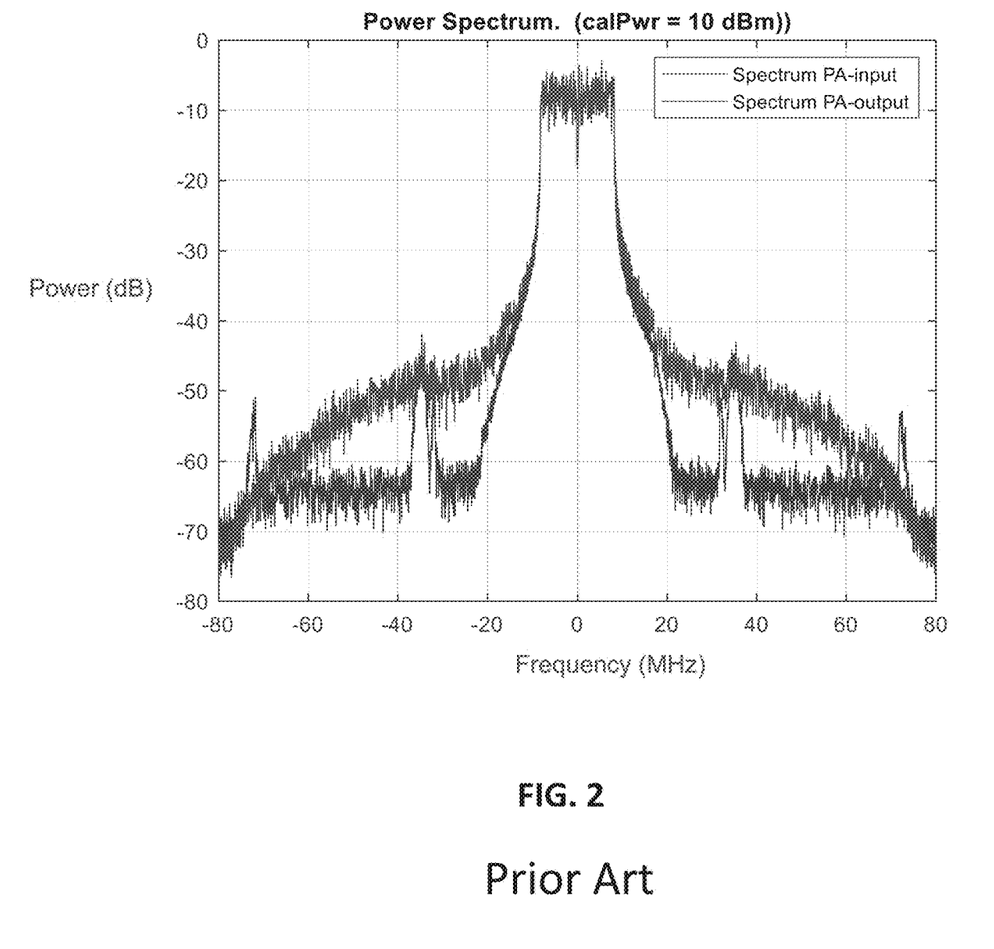
FIG. 2 is a spectrum graph illustrating a power spectrum of a spectrum PA-input and a spectrum PA-output, according to an embodiment.

Specifically, as illustrated in FIG. 2, the spectrum PA-input is well-correlated with the spectrum PA-output at and around frequencies near 0 hertz (Hz); however, the spectrum PA-input diverges from the spectrum PA-output at higher and lower frequencies. For example, a channel bandwidth (BW) may be +/−20 MHz, and as shown in FIG. 2, the spectrum PA-output is fairly well correlated with the spectrum PA-input in this range. However, Federal Communication Commission (FCC) regulations may require that adjacent channels be limited to less than predetermined power gains to avoid interference among multiple wireless communication signals being simultaneously transmitted. As shown in FIG. 2, the −20 MHz and −40 MHz range, and the 20 MHz to 40 MHz range show significant deviations from spectrum PA-input to spectrum PA-output, which may deviate from FCC regulation requirements.

In addition, the amount of power that is sent in an adjacent channel is a function of the amount of power that is transmitted the in-band channel. For example, if in-band power is low, then the power in the adjacent power level will likely be low and in compliance with FCC regulations. However, in this case, a low in-band power is not ideal because the maximum power in-band is limited. In this case, a wireless communication device would operate with low power levels, which may result in decreased signal strength and/or range.

Thus, due to this unwanted variation between the spectrum PA-input and the spectrum PA-output, maximum power may be restricted based on amplitude level to ensure PA-input correlates with PA-output. A solution is needed, which improves PA-characteristics across a wide range of PA-input dB for low cost PA's.

SUMMARY

The present disclosure has been made to address at least the disadvantages described above and to provide at least the advantages described below.

According to an aspect of the disclosure, an electronic device configured to apply, to a first PA input, one or more updated memory digital pre-distorter (mDPD) coefficient values is provided. The electronic device includes a processor; and a memory including a non-transitory computer readable storage medium storing instructions that, when executed, cause the processor to preload, from values stored in the memory of the electronic device, one or more mDPD coefficient values; transmit a first training signal sequence while using the preloaded one or more mDPD coefficient values; receive the first training signal sequence; update the one or more mDPD coefficient values based on the transmitted first training signal sequence, the received first training signal sequence, and the preloaded one or more mDPD coefficient values; and apply the updated one or more mDPD coefficient values to pre-distort the first PA input.

According to another aspect of the disclosure, a method of applying, to a PA input, one or more updated mDPD coefficient values is provided. The method is performed by an electronic device and includes preloading, from values stored in a memory of the electronic device, one or more mDPD coefficient values; transmitting a first training signal sequence while using the preloaded one or more mDPD coefficient values; receiving the first training signal sequence; updating the one or more mDPD coefficient values based on the transmitted first training signal sequence, the received first training signal sequence, and the preloaded one or more mDPD coefficient values; and applying the updated one or more mDPD coefficient values to pre-distort the PA input.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices utilizing storage devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "$2^{nd}$," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, firmware, or combination thereof, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

Figure 3:
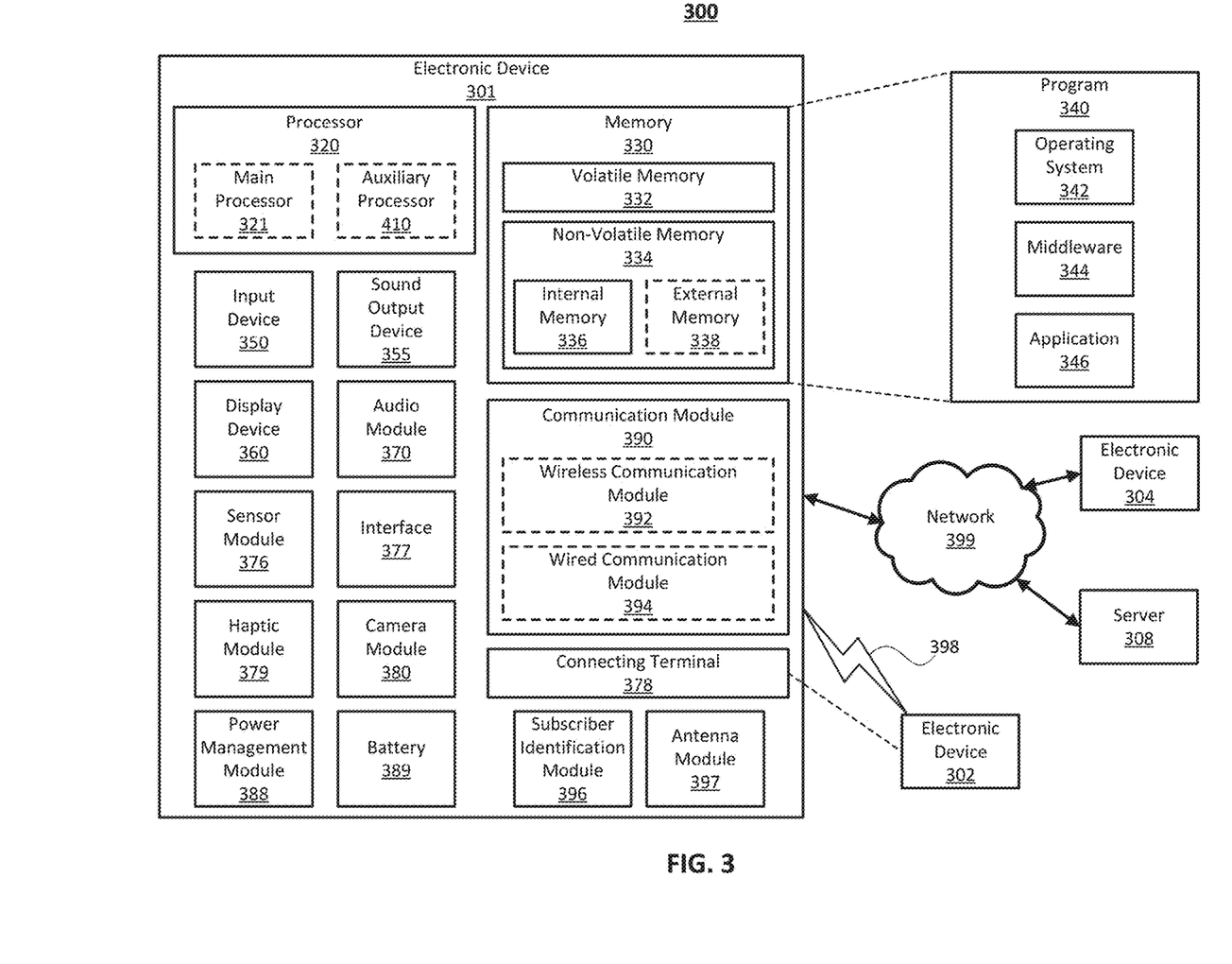
FIG. 3 is a block diagram of an electronic device in a network environment, according to an embodiment.

FIG. 3 illustrates an electronic device in a network environment, according to an embodiment.

Referring to FIG. 3, the electronic device 301, e.g., a mobile terminal including GPS functionality, in the network environment 300 may communicate with an electronic device 302 via a first network 398 (e.g., a short-range wireless communication network), or an electronic device 304 or a server 308 via a second network 399 (e.g., a long-range wireless communication network). The electronic device 301 may communicate with the electronic device 304 via the server 308. The electronic device 301 may include a processor 320, a memory 330, an input device 350, a sound output device 355, a display device 360, an audio module 370, a sensor module 376, an interface 377, a haptic module 379, a camera module 380, a power management module 388, a battery 389, a communication module 390, a subscriber identification module (SIM) 396, or an antenna module 397 including a GNSS antenna. In one embodiment, at least one (e.g., the display device 360 or the camera module 380) of the components may be omitted from the electronic device 301, or one or more other components may be added to the electronic device 301. In one embodiment, some of the components may be implemented as a single integrated circuit (IC). For example, the sensor module 376 (e.g., a fingerprint sensor, an iris sensor, or an illuminance sensor) may be embedded in the display device 360 (e.g., a display).

The processor 320 may execute, for example, software (e.g., a program 340) to control at least one other component (e.g., a hardware or a software component) of the electronic device 301 coupled with the processor 320, and may perform various data processing or computations. As at least part of the data processing or computations, the processor 320 may load a command or data received from another component (e.g., the sensor module 376 or the communication module 390) in volatile memory 332, process the command or the data stored in the volatile memory 332, and store resulting data in non-volatile memory 334. The processor 320 may include a main processor 321 (e.g., a central processing unit (CPU) or an application processor, and an auxiliary processor 323 (e.g., a graphics processing unit (GPU), an image signal processor (ISP), a sensor hub processor, or a communication processor (CP)) that is operable independently from, or in conjunction with, the main processor 321. Additionally or alternatively, the auxiliary processor 323 may be adapted to consume less power than the main processor 321, or execute a particular function. The auxiliary processor 323 may be implemented as being separate from, or a part of, the main processor 321.

The auxiliary processor 323 may control at least some of the functions or states related to at least one component (e.g., the display device 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). According to one embodiment, the auxiliary processor 323 (e.g., an image signal processor or a communication processor) may be implemented as part of another component (e.g., the camera module 380 or the communication module 390) functionally related to the auxiliary processor 323.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 or the non-volatile memory 334.

The program 340 may be stored in the memory 330 as software, and may include, for example, an operating system (OS) 342, middleware 344, or an application 346.

The input device 350 may receive a command or data to be used by another component (e.g., the processor 320) of the electronic device 301, from the outside (e.g., a user) of the electronic device 301. The input device 350 may include, for example, a microphone, a mouse, or a keyboard.

The sound output device 355 may output sound signals to the outside of the electronic device 301. The sound output device 355 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 360 may visually provide information to the outside (e.g., a user) of the electronic device 301. The display device 360 may include, for example, a display, a hologram device, or a projector and control circuitry to control a corresponding one of the display, hologram device, and projector. According to one embodiment, the display device 360 may include touch circuitry adapted to detect a touch, or sensor circuitry (e.g., a pressure sensor) adapted to measure the intensity of force incurred by the touch.

The audio module 370 may convert a sound into an electrical signal and vice versa. According to one embodiment, the audio module 370 may obtain the sound via the input device 350, or output the sound via the sound output device 355 or a headphone of an external electronic device 302 directly (e.g., wiredly) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. The sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 377 may support one or more specified protocols to be used for the electronic device 301 to be coupled with the external electronic device 302 directly (e.g., wiredly) or wirelessly. According to one embodiment, the interface 377 may include, for example, a high-definition multimedia interface (HDMI), a universal serial bus (USB) interface, a secure digital (SD) card interface, or an audio interface.

A connecting terminal 378 may include a connector via which the electronic device 301 may be physically connected with the external electronic device 302. According to one embodiment, the connecting terminal 378 may include, for example, an HDMI connector, a USB connector, an SD card connector, or an audio connector (e.g., a headphone connector).

The haptic module 379 may convert an electrical signal into a mechanical stimulus (e.g., a vibration or a movement) or an electrical stimulus which may be recognized by a user via tactile sensation or kinesthetic sensation. According to one embodiment, the haptic module 379 may include, for example, a motor, a piezoelectric element, or an electrical stimulator.

The camera module 380 may capture a still image or moving images. According to one embodiment, the camera module 380 may include one or more lenses, image sensors, image signal processors, or flashes.

The power management module 388 may manage power supplied to the electronic device 301. The power management module 388 may be implemented as at least part of, for example, a power management integrated circuit (PMIC).

The battery 389 may supply power to at least one component of the electronic device 301. According to one embodiment, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the application processor) and supports a direct (e.g., wired) communication or a wireless communication. According to one embodiment, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as Bluetooth™, wireless-fidelity (Wi-Fi) direct, or a standard of the Infrared Data Association (IrDA)) or the second network 399 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple Ics) that are separate from each other. The wireless communication module 392 may identify and authenticate the electronic device 301 in a communication network, such as the first network 398 or the second network 399, using subscriber information (e.g., international mobile subscriber identity (IMSI)) stored in the subscriber identification module 396.

The antenna module 397 may transmit or receive a signal or power to or from the outside (e.g., the external electronic device) of the electronic device 301. According to one embodiment, the antenna module 397 may include one or more antennas, and, therefrom, at least one antenna appropriate for a communication scheme used in the communication network, such as the first network 398 or the second network 399, may be selected, for example, by the communication module 390 (e.g., the wireless communication module 392). The signal or the power may then be transmitted or received between the communication module 390 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 301 and the external electronic device 304 via the server 308 coupled with the second network 399. Each of the electronic devices 302 and 304 may be a device of a same type as, or a different type, from the electronic device 301. All or some of operations to be executed at the electronic device 301 may be executed at one or more of the external electronic devices 302, 304, or 308. For example, if the electronic device 301 should perform a function or a service automatically, or in response to a request from a user or another device, the electronic device 301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 301. The electronic device 301 may provide the outcome, with or without further processing of the outcome, as at least part of a reply to the request. To that end, a cloud computing, distributed computing, or client-server computing technology may be used, for example.

One embodiment may be implemented as software (e.g., the program 340) including one or more instructions that are stored in a storage medium (e.g., internal memory 336 or external memory 338) that is readable by a machine (e.g., the electronic device 301). For example, a processor of the electronic device 301 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Additionally or alternatively, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 4:
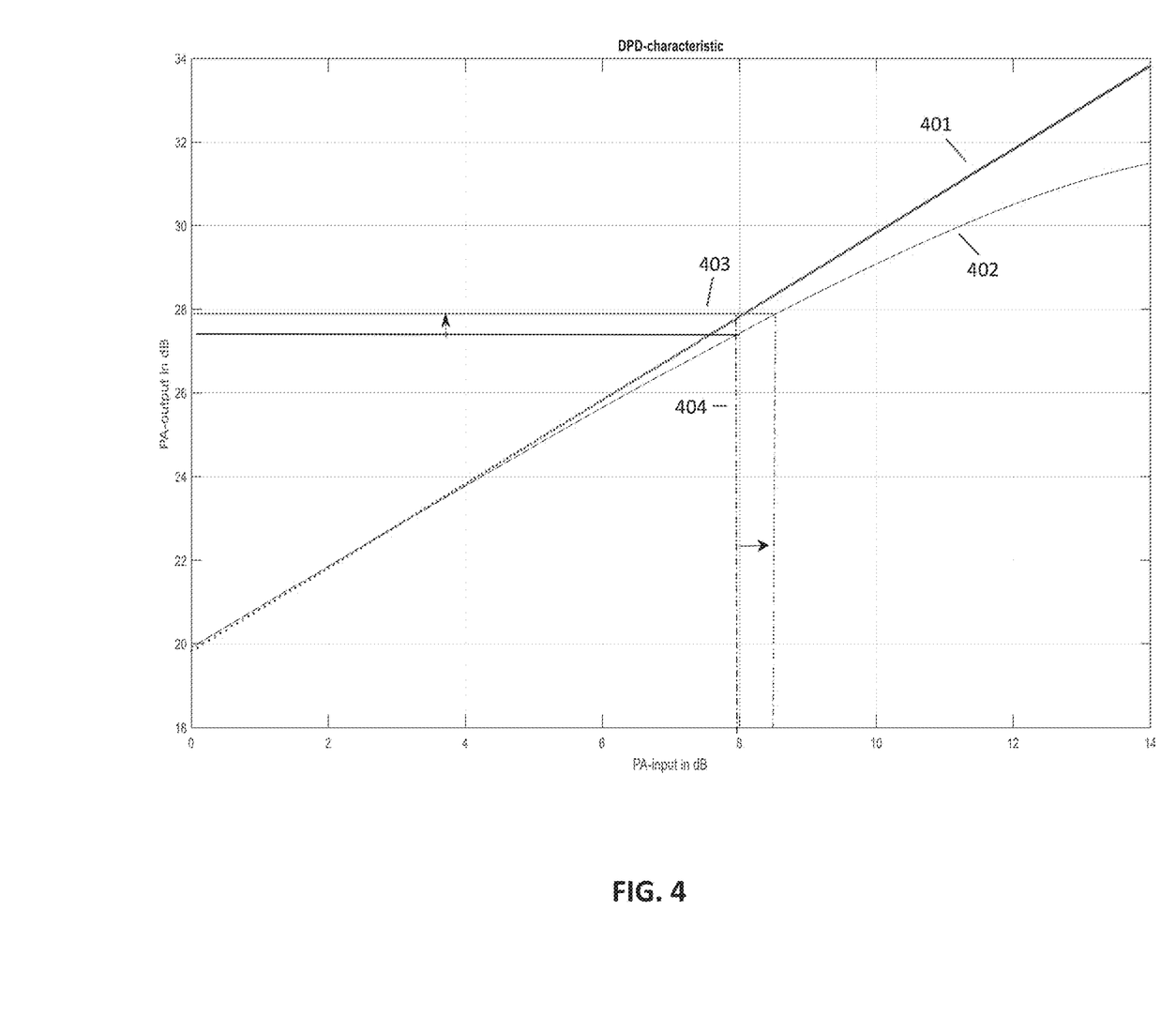
FIG. 4 is a graph illustrating a digital pre-distorter (DPD) characteristic, according to an embodiment.

FIG. 4 is a graph illustrating a digital pre-distorter (DPD) characteristic, according to an embodiment.

DPDs may be used to improve the PA output characteristics. That is, a DPD may operate in the digital signal processing (DSP) domain to counteract nonlinearities of the PA output characteristics. For example, a DPD may identify the output distortion of the PA output relative to the PA input and implement an inverse distortion to counteract (or balance) the PA output value relative to the PA input value across a range of PA input values.

Different DPD designs may be used to improve the PA output characteristics. If an amplitude and phase of an input signal is corrected based only on the current sample, that design may be called a memoryless DPD design, which may be typical in the case of low BW (e.g., 20 MHz or less) PA input signals. The memoryless DPD design may be selectively used in low BW applications (e.g., 20 MHz or less).

On the other hand, if the amplitude and phase of the input signal is corrected based on the past and present samples, the PA-memory may be used so that the previous input may provide an indication of the present output. This design may be called an mDPD. For instance, in high BW situations (e.g., a PA-input BW higher than 20 MHz), the current PA-output may depend, not only on the current PA-input, but also on past and/or future PA-input values. In cases such as these, the current nonlinearity experienced by a PA-output relative to a PA-input (e.g., the DPD-characteristic shown in FIG. 4) may be corrected using an mDPD design. Accordingly, a memoryless DPD design is customary for low BW samples, and an mDPD design is customary for high BW samples.

With reference to FIG. 4, as mentioned above, ideally the gain should be constant across all input amplitude levels. The ideal gain is shown in FIG. 4 with reference numeral 401. However, in practice, as shown above in FIG. 1, the PA-input can be well-correlated with the PA-output at and around low power levels, and the PA-input may diverge from the ideal PA-output at higher power levels. This phenomenon is illustrated in FIG. 4 with reference numeral 402, which corresponds to values of the actual PA-output relative to the PA-input, and may be referred to as the actual PA-response.

In even more detail, for example, an input amplitude of 8 decibels (dB) would ideally result in an output dB of about 28 dB, corresponding to reference numeral 403. However, in practice, the output dB may be lower (corresponding to the value along the actual PA-output value line 402), as shown with respect to reference numeral 404.

Therefore, in order to improve ideal DPD-characteristics across varying input amplitude levels, the present application proposes solutions to more efficiently calibrate and operate DPDs and/or mDPDs for a wide range of input amplitude levels.

A DPD may operate in two phases (e.g., modes). In a first phase (e.g., a calibration phase), the DPD may create a look up table that will provide the gain and phase distortion of one or more (or all) input samples (e.g., subsequently, during normal operation). In other words, during the calibration phase, the DPD may determine how much amplification should be provided for any given input sample. The calibration phase may occur, for example, each time an electronic device is connected to a new Wi-Fi channel, or after a predetermined period of time, or after a device reaches a predetermined temperature (e.g., a "hot" device). In addition, calibration may be performed for other types of wireless communication systems besides Wi-Fi, such as fifth generation (5G), fourth generation (4G), long term evolution (LTE), as well as other cellular telephone communication systems.

In a second phase (e.g., a normal operation phase), for each input sample provided to the DPD, the corresponding amplitude and phase gain may be obtained from a look up table. These gains may be applied to the samples and subsequently passed to a digital to analog converter (DAC), and then to the PA.

Figure 5:
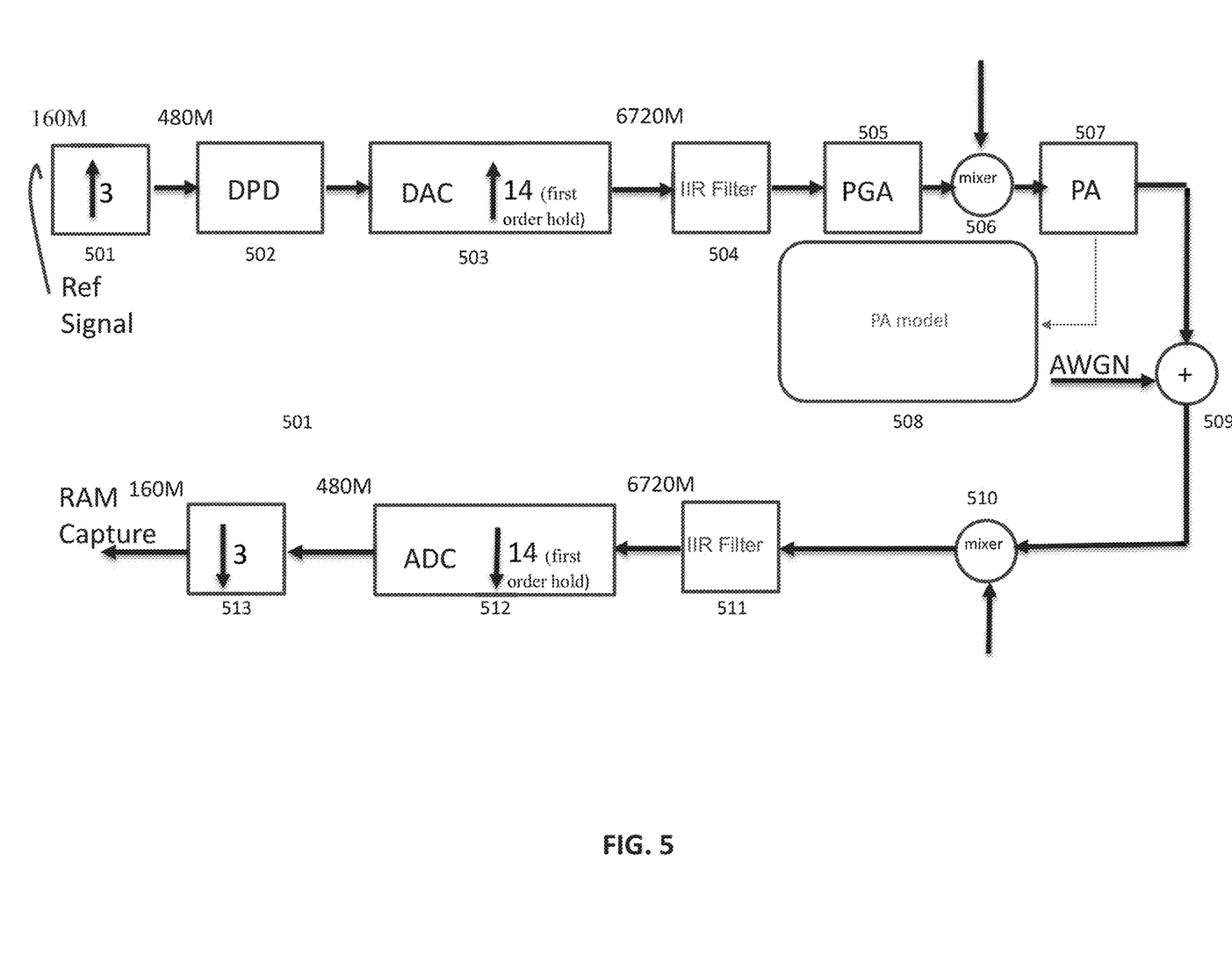
FIG. 5 is a block diagram illustrating a calibration configuration of a DPD, according to an embodiment.

FIG. 5 is a block diagram illustrating a calibration configuration of a DPD, according to an embodiment.

The values of the signals, bandwidths, and timings shown in FIG. 5 are for illustrative purposes only and other values may be used.

Referring to FIG. 5, a reference signal (e.g., a baseband signal) is provided as input at block 501. The reference signal may be a Wi-Fi signal with, e.g., a 20 megahertz (MHz) BW at 160 million samples/second (M). The reference signal is a signal that includes characteristics (e.g., a start sequence and a stop sequence) that are recognizable by the transmitter and the receiver. The BW size and/or the sample rate, described above, are provided as an example, and actual values may vary.

The reference signal is upsampled by a factor of 3 at block 501, and the sample size reaches 480 M (e.g., 160*3). At block the 502, the reference signal, now 480M, is provided to the DPD, which pre-distorts the reference signal (note, at the very first pass of the reference signal, the DPD may be bypassed and not provide any distortion to the reference signal (e.g., the DPD may be set to 1)). At block 503, the sample size may now be 6720M and the reference signal passing a DAC is filtered by the infinite impulse response (IIR) filter (e.g., a $3^{rd}$ order Butterworth filter) at block 504, and is provided to a programmable gain amplifier (PGA) at block 505 to provide a power boost (e.g., 1000× (from nano to micro)) to the reference signal. At block 506, a mixer combines the reference signal from the PGA at block 505 to output the reference signal to an appropriate channel (e.g., combining a baseband signal with a sinusoidal signal of the appropriate channel), and provides the reference signal to the PA at block 507.

The reference signal provided to the PA at block 507 may correspond to the PA-input signal 402 shown in FIG. 4. The PA 507 may perform a PA model at block 508. The PA model may include, but is not limited to, envelope tracking, a cellular network PA model, a WLAN PA model, SKY78041, DATTQF6892 at, for example, 0 to 0.3754 V. The reference signal output from the PA 507 and the additive white Gaussian noise (AWGN) signal output from the PA model 508 are added at block 509 to perform a loopback mechanism for calibration.

At mixer block 510, the reference signal is downconverted (e.g., the reference signal is downsampled to a baseband channel). The output of the mixer 510 is filtered at block 511 by the IIR filter (e.g., $5^{th}$ order Butterworth) and converted to a digital reference signal using an analog digital converter (ADC) at block 512. The received reference signal is downsampled by a factor of 3 at block 514, and it is output as a RAM capture signal.

Because the reference signal is known to the transmitter and the receiver, a difference in signal characteristics may be identified by comparing the reference signal that was input to block 501 and the reference signal that was output from block 513 to train the DPD.

Figure 6:
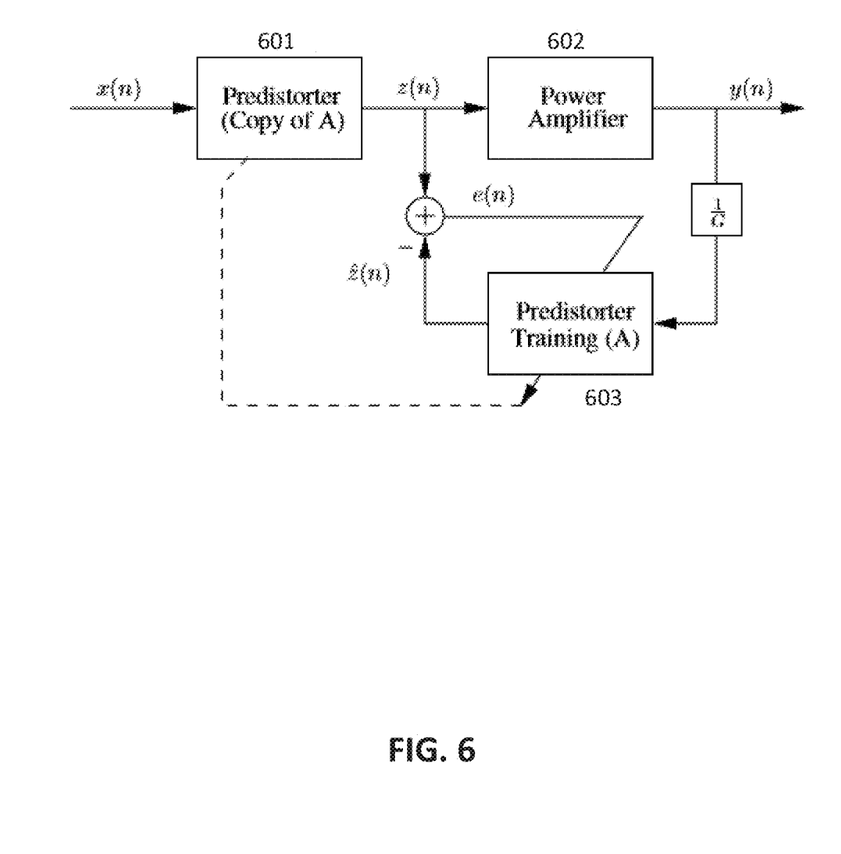
FIG. 6 is a block diagram illustrating a calibration operation of a DPD, according to an embodiment.

FIG. 6 is a block diagram illustrating a calibration operation of a DPD, according to an embodiment.

Referring to FIG. 6, x(n) is a reference signal input to the predistorter 601 (e.g., corresponding to a reference signal after the first pass), z(n) is a reference signal input to the power amplifier 602 (e.g., corresponding to a reference signal at the first pass (with no distortion from the DPD (e.g., the DPD is set to 1))), y(n) is a reference signal output from the PA 602 (e.g., corresponding to the reference signal output from the PA 507 in FIG. 5). The y(n) reference signal is divided by the average PA gain (G) and provided to block 603 for predistorter training.

Therefore, because y(n)/G is the output of the PA 602, and z(n) is the input of the PA 602, at the beginning of the adaptation, $\hat{z}(n)$ may be set to 0 so that the error signal $e(n)$ may be equal to $z(n)$ (to initially calibrate the mDPD). The error signal $e(n)$ may be used to train the predistorter training 603 based on the reference signal $z(n)$ input to the PA 602 and the actual output of the predistorter training (A) for each reference signal sequence to cause the predistorter training 603 to distort a signal to be as close to the inverse of the PA 602 as possible.

Ideally, $y(n)/G$ should be equal to $x(n)$. Therefore, predistorter 601 should generate a $z(n)$ signal that accounts for signal variations caused by the PA to generate $y(n)/G$ to be similar to $x(n)$.

As reference signal sequences are passed through the PA 602 and to the predistorter training 603, the predistorter training 603 improves (thereby improving the predistorter 601, which is a copy of 603), so that eventually the error signal $e(n)$ approaches 0 and/or becomes negligible as subsequent reference signals $x(n)$ pass through it. At this point, the predistorter 601 (e.g., DPD 502) may be sufficiently trained and calibration may be complete.

Error vector magnitude (EVM) may be defined as the mean of $(|y(n)/G-x(n)|^2/\text{mean }(|x(n)|^2)$. EVM is a performance metric that can be used to understand the effectiveness (e.g., accuracy) of adjustments made the to mDPD by measuring the input signal $x(n)$ and the output signal $y(n)$. EVM is a useful system-level metric to quantify the combined impact of all the potential impairments in a system through a single and easy to understand value. Ideally, EVM should be as low as possible, which represents a minimal difference between fidelity of the signal input to the PA and output from the PA.

Conventionally, calibration may require many data packets, each data packet including many samples. Therefore, calibration across all channels and power levels may be performed slowly. In addition, PA characteristics can be very similar for devices included in the same batch of production. "The same batch of production" should mean devices that are manufactured during a similar time period, and therefore are more likely to experience similar characteristics when implemented into systems. These devices from the same batch of production may be advantageously used to calibrate together. For example, if one device from the same batch of production undergoes calibration, and a calibration table is determined, then the calibration table could be applied to other devices from the same batch of production, thereby effectively skipping the calibration phase for the other devices in the same batch of production, which improves overall calibration efficiency.

In order to reduce the calibration time, the present application proposes setting at least one factory calibrated coefficient at one or more appropriate operating points (e.g., a similar frequency and/or similar power level) to preload to the mDPD (e.g., for the same batch of PA devices). A useful characteristic of preloading at least one factory calibrated coefficient is that performing a training sequence with preloading takes significantly less time than performing a training sequence without preloading, and the resulting EVM may be acceptable using preloaded factory calibration coefficients and a smaller number of training sequences (e.g., sending of subsequent reference signals to achieve a minimal $e(n)$) that would otherwise be necessary to achieve a similar EVM.

For the purposes of this description, preloading at least one factory calibrated coefficient means loading at least one factory calibrated coefficient to the mDPD prior to sending a training signal sequence (e.g., a reference signal) during a calibration mode. The preloaded at least one factory calibrated coefficient can then be used by the mDPD to distort an input signal much more effectively (accurately) to produce a low $e(n)$ and a low EVM. Accordingly, preloading can speed up the calibration process because fewer training sequences (e.g., calibration cycles or reference signals) will be needed to train the mDPD to have a nominal $e(n)$. During calibration, the input signal may be a training sequence, and updated coefficients can be obtained based on the preloaded at least one factory calibrated coefficient.

For example, when factory calibrated coefficients are preloaded and a first (e.g., an initial) training sequence is transmitted, then sets of updated coefficients may be obtained which can be used for preloading during the subsequent training sequences (and/or transmitting signals carrying data packets). Over time, as additional training signals are sent and updated coefficients are obtained for each training signal transmission, the value of the EVM improves and a low (nominal) EVM value can be obtained.

According to an embodiment, the present disclosure proposes preloading the updated coefficients that have been calculated based on at least one factory calibrated coefficient and training sequences (e.g., preloading updated coefficients that were previously determined based on factory calibrated coefficients applied to a training signal). Since the updated coefficients have already been determined, they may be preloaded for transmitting a signal very quickly without first transmitting a training sequence for calibration. In addition, preloading the updated coefficients to perform transmission (without training) results in EVM values that are better than transmission with preloaded factory calibrated coefficients (without training). This feature of preloading updated coefficients and performing transmission without having to use a training sequence for calibration is advantageous because preloading may be performed much more quickly than when training is performed, and the resulting EVM may also be in an acceptable range for successful signal transmissions.

For example, in certain systems (e.g., 802.11ax and trigger-based (TB) physical-layer protocol data units (PPDU)), an access point (AP) may assign a power level and time period for a wireless device to perform a transmission. In such cases, a wireless device may not have the necessary time to perform a calibration sequence that includes many training cycles of long non-overlapping samples, and it may be important for the wireless device to quickly preload coefficients to the mDPD so that an acceptable EVM range can be achieved to ensure the transmissions can be successfully performed. In a first case, when an mDPD is not preloaded with coefficients, it is likely that the EVM value will be poor (e.g., worse than −20 dB) and the transmission will not be successful. In a second case, when the mDPD is preloaded with factory calibrated coefficients, an EVM value may be better than without preloading, but may still not be within an acceptable range for successful transmissions. In a third case, when the mDPD is preloaded with the updated coefficients, a lowest (and best) EVM can be achieved, thereby increasing the likelihood of successful signal transmissions for, in particular, low quadrature amplitude modulation (QAM) values (e.g., less than 1024 QAM). If the QAM value is at or above a predetermined value, then training may need to be performed after preloading the updated coefficients in order to obtain an acceptable EVM.

Thus, by preloading the updated coefficients (e.g., the third case instead of the first or second case), a best EVM can be achieved even after a long time duration, thereby requiring fewer periodic calibrations by the wireless device and improving overall transmission speeds (e.g., strong signal and/or high bandwidth). In addition, the updated coefficients may be preloaded to other wireless devices in the same batch of production to further improve transmission speeds and reduce the duration of calibration.

As mentioned above, factory calibration of the mDPD may be performed for each PA batch during the calibration phase. For example, factory calibration may be performed for each channel and each output power point that are sufficiently far apart (e.g., greater than a predetermined power level (e.g., 3 dB)), and at least one factory calibrated mDPD coefficient may be stored in memory included in the mDPD (e.g., a non-transitory memory included in the mDPD). Optionally, factory calibrated mDPD coefficients may be applied to other devices from the same batch to bypass calibrating these devices individually.

During the normal operation phase, at least one factory calibrated mDPD coefficient may be preloaded for a selected channel Next, a capture cycle may be performed, and then an adaptation cycle may be performed. An output from the adaptation cycle may represent an updated at least one factory calibrated mDPD coefficient, and may be loaded into the mDPD memory.

The capture cycle will now be described. An external wireless device (e.g., a Wi-Fi transmitting device operating in an AP or station (STA) mode) may transmit a clear to send (CTS) signal and reserve a channel for a transmit opportunity (TXOP) duration to ensure that no other devices are transmitting during the capture cycle operation. The CTS signal may be sent in response to a request to send (RTS) signal transmitted from a wireless device. The duration of the TXOP should be greater than or equal to the duration of the training sequence transmission.

In response to a recalibration condition being identified (e.g., sensing a temperature to be equal to or greater than a predetermined value, after a predetermined amount of time, if an error vector magnitude (EVM) is equal to or greater than a predetermined number, or upon an initial calibration of the electronic device), the wireless device may send the RTS signal, and once the CTS is received, the wireless device may then transmit a training sequence (e.g., the same training sequence may be repeatedly transmitted) until a predetermined EVM is achieved (e.g., the EVM is less than or equal to a predetermined value). The wireless device (e.g., a Wi-Fi device) may receive (capture) the training sequence and store it in DRAM. To reduce the duration for calibration, the process of storing can be performed in the background as a low priority job.

The adaptation cycle will now be described. The wireless device may process a predetermined number of copies of the stored training sequence received from the wireless device to identify a start and end of the training sequence (e.g., a string of values to identify a start of the training sequence and a string of values to identify an end of the training sequence). An average training sequence of the received training sequences may be calculated using a specified number of copies of the training sequences to increase the signal to noise ratio (SNR) of the received signal to suppress unwanted noise. Optionally, the first copy of the training sequence may not be used to avoid unknown artifacts in the capture. Then, the factory computed coefficients may be preloaded into the mDPD memory. An mDPD adaption algorithm may be performed to output updated mDPD coefficients.

Figure 7:
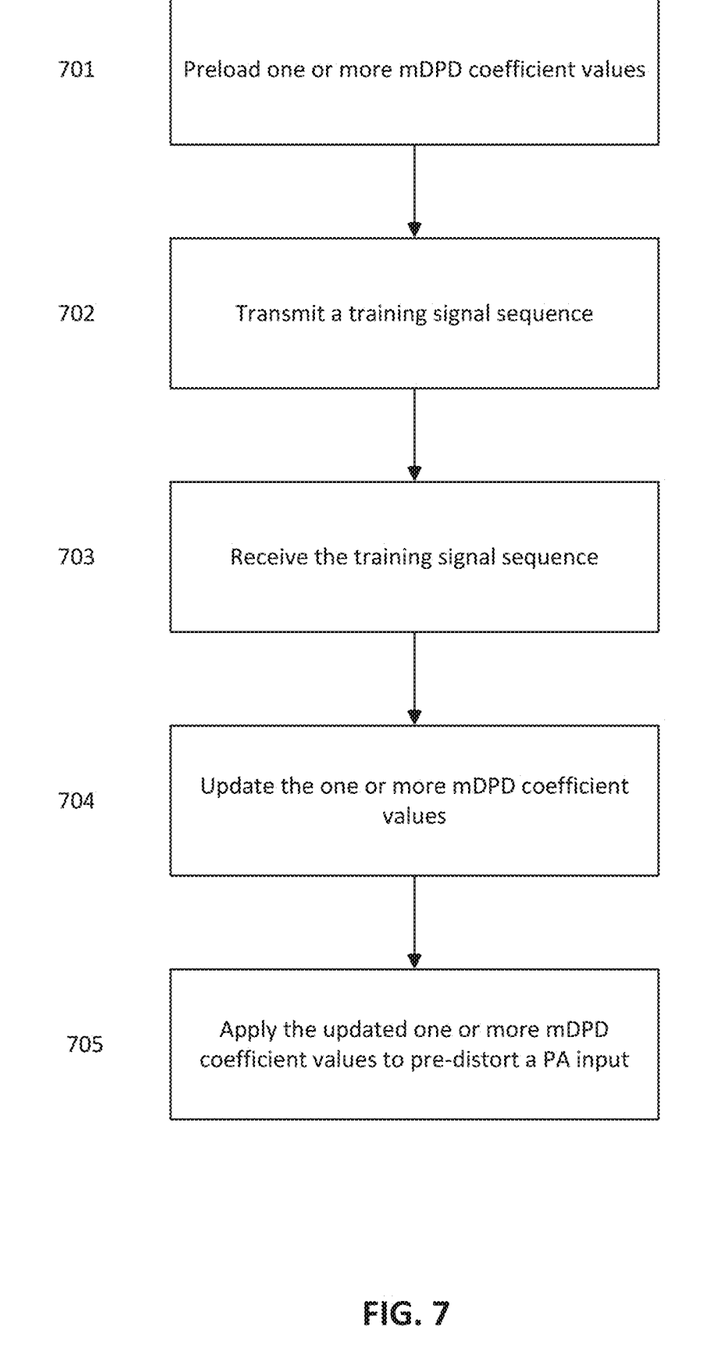
FIG. 7 is a flowchart illustrating a method performed by an electronic device, according to an embodiment.

FIG. 7 is a flowchart illustrating a method performed by an electronic device, according to an embodiment.

The method shown in FIG. 7 may be capable of updating one or more mDPD coefficient values to distort a PA input to improve a calibration time for wireless connectivity. The method may be performed by an electronic device, such as a wireless communication device, a client-side device, a user equipment device, a terminal device, a base station device, an application processor, as well as other electronic devices.

Referring to FIG. 7, in step 701, one or more mDPD coefficient values are preloaded. The one or more mDPD coefficient values may be factory calibrated values and stored in a memory of the electronic device. In step 702, the electronic device transmits a training signal sequence. The training signal sequence may be transmitted using the preloaded one or more mDPD coefficient values. In step 703, the electronic device receives the training signal sequence. In step 704, the electronic device updates the one or more mDPD coefficient values. The one or more mDPD coefficient values may be updated based on the transmitted training signal sequence, the received training signal sequence, and the initialized one or more mDPD coefficient values. In step 705, the electronic device applies the updated one or more mDPD coefficient values to distort a PA input. The PA input may be distorted to improve its mDPD characteristics so that a PA input is linearized with respect to a PA output across a range of PA inputs.

Accordingly, as described above, the present application proposes solutions to improve a PA characteristic by providing techniques to more quickly calibrate PA signaling and reduce how often calibration is needed. Therefore, the present application improves the overall throughput and/or efficiency of wireless communication systems because the amount of time spent for calibration (e.g., when CTS/RTS signaling is invoked) is reduced, and thus, the amount of available airtime for transmitting data packets is increased.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device configured to apply, to a first power amplifier (PA) input, one or more updated memory digital pre-distorter (mDPD) coefficient values, the electronic device comprising:
   a processor; and
   a memory including a non-transitory computer readable storage medium storing instructions that, when executed, cause the processor to:
   preload, from values stored in the memory of the electronic device, one or more mDPD coefficient values;
   transmit a first training signal sequence while using the preloaded one or more mDPD coefficient values;
   receive the first training signal sequence;
   update the one or more mDPD coefficient values based on the transmitted first training signal sequence, the received first training signal sequence, and the preloaded one or more mDPD coefficient values; and
   apply the updated one or more mDPD coefficient values to distort the first PA input.

2. The electronic device of claim 1, wherein applying the updated mDPD coefficient values to distort the PA input linearizes an output of the PA across a range of PA inputs.

3. The electronic device of claim 1, wherein preloading the one or more mDPD coefficient values includes preloading a plurality of mDPD coefficient values corresponding to a plurality of input PA power levels or frequencies.

4. The electronic device of claim 3, wherein the plurality of input PA power levels or frequencies are spaced apart by a predetermined power level spacing value or a predetermined frequency spacing value.

5. The electronic device of claim 1, wherein updating the one or more mDPD coefficient values is performed for PA input values above a predetermined power level threshold.

6. The electronic device of claim 1, wherein the instructions, when executed, further cause the processor to:
transmit a request to send (RTS) signal to reserve a channel for a transmit opportunity (TXOP) duration prior to transmitting the first training signal sequence.

7. The electronic device of claim 6, wherein the TXOP duration is greater than or equal to a duration of the first training signal sequence.

8. The electronic device of claim 6, wherein the RTS signal is transmitted in response to a temperature of the electronic device being sensed to be equal to or greater than a predetermined value, after a predetermined amount of time, if an error vector magnitude (EVM) is equal to or greater than a predetermined number, or upon an initial calibration of the electronic device.

9. The electronic device of claim 1, wherein receiving the first training signal sequence includes receiving a plurality of training sequence copies.

10. The electronic device of claim 1, wherein the instructions, when executed, further cause the processor to:
preload the updated one or more mDPD coefficient values; and
apply the updated one or more mDPD coefficient values to distort a second PA input without transmitting a second training signal.

11. A method of applying, to a first power amplifier (PA) input, one or more updated memory digital pre-distorter (mDPD) coefficient values, the method performed by an electronic device and comprising:
preloading, from values stored in a memory of the electronic device, one or more mDPD coefficient values;
transmitting a first training signal sequence while using the preloaded one or more mDPD coefficient values;
receiving the first training signal sequence;
updating the one or more mDPD coefficient values based on the transmitted first training signal sequence, the received first training signal sequence, and the preloaded one or more mDPD coefficient values; and
applying the updated one or more mDPD coefficient values to distort the first PA input.

12. The method of claim 11, wherein applying the updated mDPD coefficient values to distort the PA input linearizes an output of the PA across a range of PA inputs.

13. The method of claim 11, wherein preloading the one or more mDPD coefficient values includes preloading a plurality of mDPD coefficient values corresponding to a plurality of input PA power levels or frequencies.

14. The method of claim 13, wherein the plurality of input PA power levels or frequencies are spaced apart by a predetermined power level spacing value or a predetermined frequency spacing value.

15. The method of claim 11, wherein updating the one or more mDPD coefficient values is performed for PA input values above a predetermined power level threshold.

16. The method of claim 11, further comprising:
transmitting a request to send (RTS) signal to reserve a channel for a transmit opportunity (TXOP) duration prior to transmitting the first training signal sequence.

17. The method of claim 16, wherein the TXOP duration is greater than or equal to a duration of the first training signal sequence.

18. The method of claim 16, wherein the RTS signal is transmitted in response to a temperature of the electronic device being sensed to be equal to or greater than a predetermined value, after a predetermined amount of time, if an error vector magnitude (EVM) is equal to or greater than a predetermined number, or upon an initial calibration of the electronic device.

19. The method of claim 11, wherein receiving the first training signal sequence includes receiving a plurality of training sequence copies.

20. The method of claim 11, further comprising:
preloading the updated one or more mDPD coefficient values; and
applying the updated one or more mDPD coefficient values to distort a second PA input without transmitting a second training signal sequence.

* * * * *